(No Model.)

O. M. LOVERIDGE.
PACKING FOR PIPE JOINTS.

No. 265,681. Patented Oct. 10, 1882.

Witnesses:
Geo. H. Strong
J. H. Nourse

Inventor
O. M. Loveridge
By Dewey & Co
Attorneys

UNITED STATES PATENT OFFICE.

ORANGE M. LOVERIDGE, OF WEAVERVILLE, CALIFORNIA.

PACKING FOR PIPE-JOINTS.

SPECIFICATION forming part of Letters Patent No. 265,681, dated October 10, 1882.

Application filed July 31, 1882. (No model.)

*To all whom it may concern:*

Be it known that I, O. M. LOVERIDGE, of Weaverville, county of Trinity, State of California, have invented an Improved Packing for Pipe-Joints; and I do hereby declare the following to be a full, clear, and exact description thereof.

My invention relates to a novel packing for the meeting ends of pipes; and it consists of two metal rings, between which is inserted a leather or other flexible ring or band, a portion of which is folded over on the outer surface of one of the metal rings, the whole being secured together by means of bolts. This is secured in the smaller end of the pipe by means of rivets through the inner ring, the outer ring, with the circumscribing packing-ring, extending from the end, and when said pipe is fitted in the enlarged end of the next pipe said packing-ring presses outwardly against the large pipe and makes a tight joint.

My invention is especially applicable to water-pipes connected by what is known as a "slip-joint;" and its object is to form a tight joint when the water is turned on and a loose one when it is turned off, and thus to allow ready connection and disconnection of the pipes when necessary, and allow the pipe to expand and contract by the heat and cold without moving on any but the slip-joints.

Figure 1:
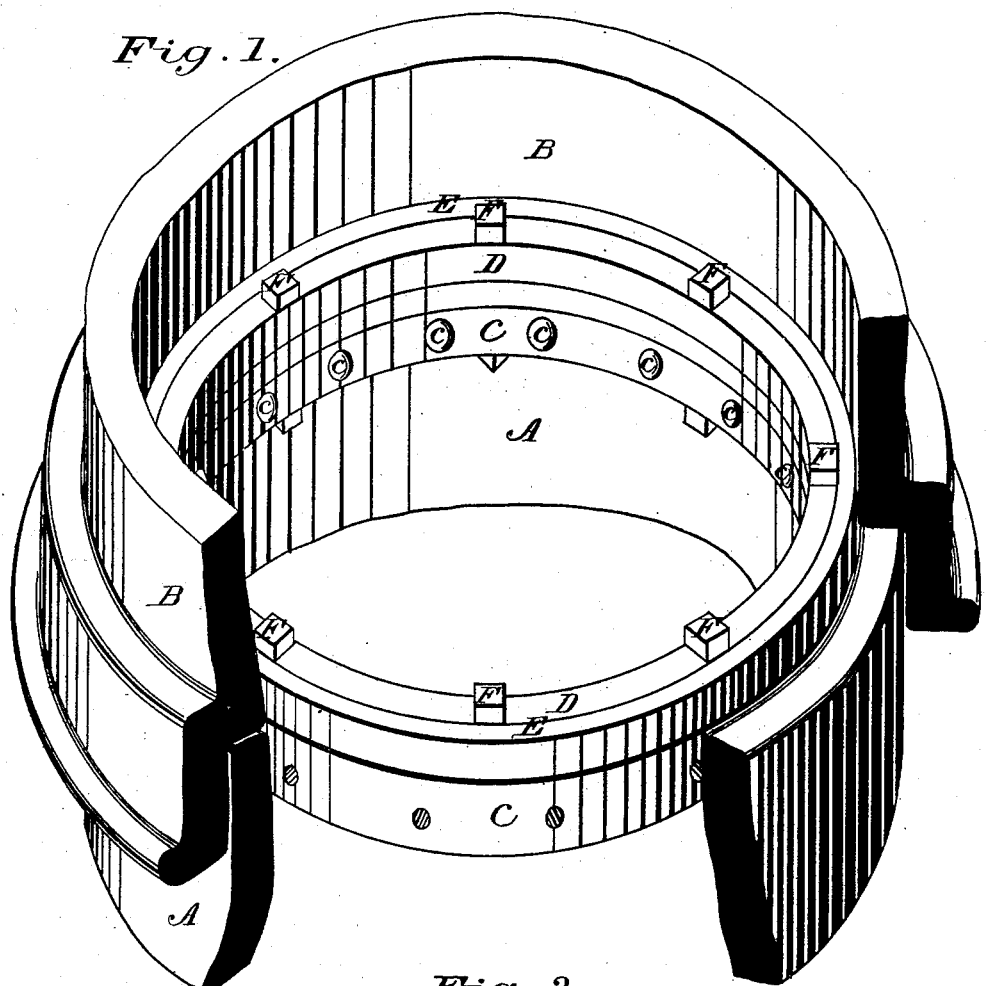
Figure 2:
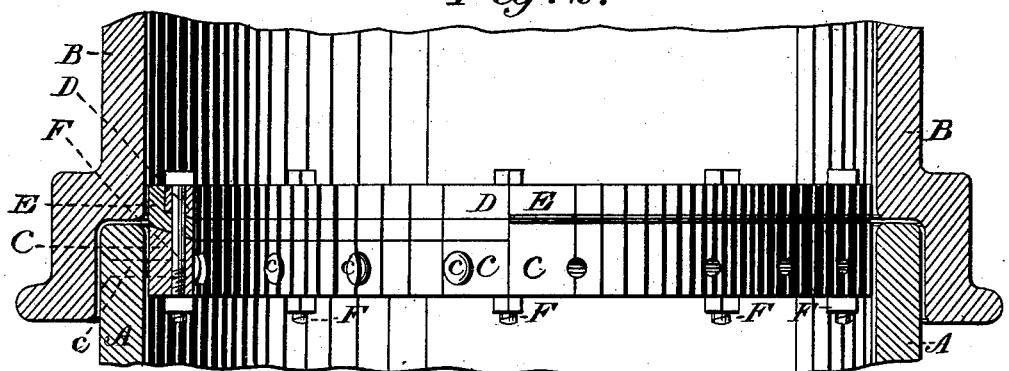

Referring to the accompanying drawings, Figure 1 is a perspective view of my packing-ring, showing its application. Fig. 2 is a half-section and a half-elevation of my packing-ring.

Let A represent one water-pipe and B another. The end of the latter is enlarged, and is adapted to fit over the end of the former, forming what is called a "slip-joint." A joint thus formed is usually so tight that the pipes can be separated only with difficulty; or if they can be easily separated the joint is not tight enough to prevent the escape of the water.

Let C represent a metal ring or band adapted to fit within the end of pipe A. It has a thickness of, say, one inch. It is riveted within the end of pipe A by means of rivets c, which are countersunk to form a smooth surface.

D is a metal ring or band having an inside diameter equal to band C; but it is not as thick, being only about, say, three-fourths of an inch.

E is a leather ring or band having an inside diameter equal to the rings C and D. This band is placed next the outer edge of the ring C, and the ring D is placed next to it, and both are secured to ring C by means of bolts F. The leather packing-ring E and the ring D both project beyond the end of pipe A. The outer edge of the leather ring is turned down upon the outer surface of ring D, which, on account of having less thickness, receives it, and the two together have a thickness about equal to ring C. The pipe A and the rings C, D, and E are then fitted into the enlarged end of pipe B. The leather ring E fits its turned-down portion against the inner surface of said pipe. When the water is turned on it presses the leather packing against said pipe and makes a tight joint. When it is turned off the packing is loose again, and the pipes may be easily slipped apart. This is a great advantage, as I may unjoint them readily when the water is off, and yet a tight joint is made when the water is on by forcing the loose turned-down portion of the packing-ring against the inside of the pipe.

Having thus described my invention, what I claim as new, and desire to secure by Letters Patent, is—

A packing for pipe-joints, consisting of the metal ring or band C, secured within the end of a pipe, the metal ring or band D, and the intervening leather or flexible packing-ring, E, both of which are secured to ring C by bolts F, and extend beyond the end of the pipe, the flexible ring being turned down upon the outer surface of ring D, and the whole inserted within the enlarged end of another pipe, and operating substantially as herein described.

In witness whereof I hereunto set my hand.

ORANGE M. LOVERIDGE.

Witnesses:
S. J. HENSLEY,
OTTO VOLLMERS.